United States Patent [19]

Ito

[11] Patent Number: 4,773,726
[45] Date of Patent: Sep. 27, 1988

[54] PUSHER DEVICE FOR PLASTIC OPTICAL FIBER

[75] Inventor: Eiji Ito, Furukawa, Japan

[73] Assignee: Alps Electric Co., Ltd., Japan

[21] Appl. No.: 923,304

[22] Filed: Oct. 27, 1986

[30] Foreign Application Priority Data

Oct. 31, 1985 [JP] Japan ................ 60-166730[U]

[51] Int. Cl.$^4$ .................. G02B 6/36; G02B 7/26
[52] U.S. Cl. ........................ 350/96.20; 350/96.21
[58] Field of Search .......... 350/96.20, 96.21, 96.22

[56] References Cited

U.S. PATENT DOCUMENTS 4,427,879 1/1984 Becher et al. ............... 350/96.2

FOREIGN PATENT DOCUMENTS 0040646 3/1979 Japan ........................ 350/96.2
0058512 4/1983 Japan ........................ 350/96.2
0166311 10/1983 Japan ........................ 350/96.2
0164520 9/1984 Japan ........................ 350/96.2

Primary Examiner—Stanley D. Miller
Assistant Examiner—David R. Bertelson
Attorney, Agent, or Firm—Guy W. Shoup; Leighton K. Chong; Paul J. Winters

[57] ABSTRACT

Disclosed herein is a pusher device for a plastic optical fiber comprising a pair of pusher members for holding and fixing end portions of plural plastic optical fibers covered with sheaths, and an annular fixing member engaged with an outer cover for covering at least a part of said sheaths not held by said pair of pusher members and generally covering said plural plastic optical fibers, said fixing member being rotatably received in a space defined by said pair of pusher members in such a manner as to be restrained from getting out of said space. Even when the optical fiber cable is pulled or bent near the end portion thereof, the end surfaces of the optical fibers are not slipped.

3 Claims, 3 Drawing Sheets

PUSHER DEVICE FOR PLASTIC OPTICAL FIBER

BACKGROUND OF THE INVENTION

The present invention relates to a pusher device for positioning the ends of plastic optical fibers, and more particularly to a pusher device employable for a multiple-core optical fiber cable incorporating plural plastic optical fibers.

FIG. 3 shows a perspective view of an end portion of a dual-core optical fiber cable in the prior art. As shown in FIG. 3, an optical fiber cable 1 is constituted of two plastic optical fibers 2 and 3 having different flows, sheaths 4 and 5 made of polyethylene, etc. for covering the respective optical fibers 2 and 3, and an outer cover 6 made of polyvinyl-chloride, etc. for generally covering the sheaths 4 and 5. The sheaths 4 and 5 are exposed at the end portion of the optical fiber cable 1, and are held by a pusher device (not shown) to enhance a frictional force between the optical fiber 2 and the sheath 4 and a frictional force between the optical fiber 3 and the sheath 5, thus positioning the ends of the optical fibers 2 and 3. The optical fibers 2 and 3 are projected from the end surfaces of the sheaths 4 and 5 by a predetermined amount. The end surfaces 2a and 3a of the optical fibers 2 and 3 are arranged in opposed relation with an optical connector (not shown) so as to transmit an optical signal.

However, in the conventional pusher device, the end portions of the sheaths 4 and 5 are only held by a predetermined clamping force. Therefore, when a tensile force is applied near the end portion of the optical fiber cable 1, the end portions of the optical fibers 2 and 3 are also pulled to easily generate slippage of the end surfaces 2a and 3a. In order to prevent a bad influence of the tensile force to the end portions of the optical fibers 2 and 3, it may be proposed that the end portion of the outer cover 6 is fixed to the pusher device. In this case, when the optical fiber cable 1 is bent near its end portion as shown in FIG. 3, the end surfaces 2a and 3a of the optical fibers 2 and 3 are slipped from a predetermined position because of difference in curvature. For example, the optical fiber 2 on the side of smaller curvature in FIG. 3 is projected from the predetermined position, and is brought into abutment against the optical connector (not shown) to cause a serious accident such as damage of the end surfaces.

On the other hand, if the clamping force of the pusher device is increased to intensively hold the end portions of the optical fibers 2 and 3, so as to prevent the bad influence due to the tensile force and the bending, there will be generated local stress concentration to remarkably reduce light transmittance.

SUMMARY OF THE INVENTION

Accordingly, it is an object of the present invention to provide a pusher device for plastic optical fibers which may suppress slippage of the end portions of the optical fibers without necessity of an excessive clamping force applied to the end portions of the optical fibers when the optical fiber cable is pulled or bent near the end portion thereof.

According to the present invention, there is provided a pusher device for a plastic optical fiber comprising a pair of pusher members for holding and fixing end portions of plural plastic optical fibers covered with sheaths, and an annular fixing member engaged with an outer cover for covering at least a part of said sheaths not held by the pair of pusher members and generally covering said plural plastic optical fibers, the fixing member being rotatably received in a space defined by the pair of pusher members in such a manner as to be restrained from getting out of the space.

With this arrangement, the fixing member engaged with the outer cover is stopped by the pusher members in such a manner as to be restrained from getting out of the space between the pusher members. Accordingly, even when a tensile force is applied near the end portion of the optical fiber cable, the end portions of the plastic optical fibers are not badly influenced by the tensile force. Moreover, the fixing member is rotatable with respect to the pusher members. Accordingly, even when the optical fiber cable is bent near the end portion thereof, the optical fiber cable itself is suitably rotated circumferentially to thereby avoid creation of large difference in curvature of both the optical fibers.

Other objects and features of the invention will be more fully understood from the following detailed description and appended claims when taken with the accompaning drawings.

DETAILED DESCRIPTION OF THE PREFERRED EMBODIMENTS

Figure 1:
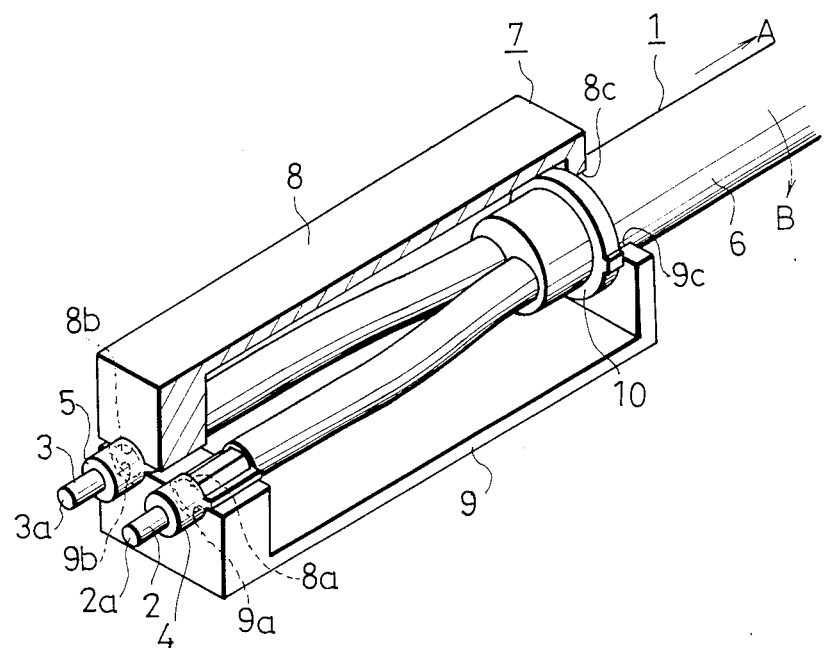
FIG. 1 is a perspective view of the essential part of the pusher device in a preferred embodiment of the present invention.
Figure 3:
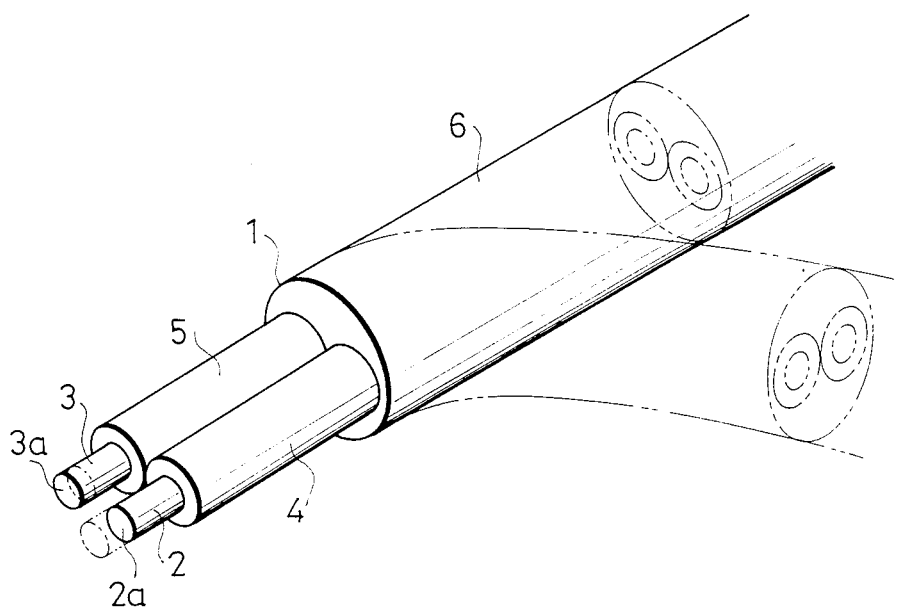
FIG. 3 is a perspective view of the end portion of the dual-core optical fiber cable in the prior art.

Referring now to FIG. 1 which shows a perspective view of the essential part of the pusher device in a preferred embodiment of the present invention, a pusher device 7 includes a pair of pusher members 8 and 9 and a fixing member 10. The other parts similar to those in FIG. 3 are designated by the same reference numerals.

As shown in FIG. 1, the pair of pusher members 8 and 9 of the pusher device 7 are provided with channel-like pushing portions 8a, 8b and 9a, 9b corresponding to two optical fibers 2 and 3, respectively, at the front ends thereof. A sheath 4 covering the optical fiber 2 is held by the pair of channel-like pushing portions 8a and 9a at the end portions thereof, and similarly a sheath 5 covering the optical fiber 3 is held by the pair of channel-like pushing portions 8b and 9b. The pusher members 8 and 9 are provided with respective recesses 8c and 9c at the rear ends thereof for receiving the end portion of an outer cover 6 of an optical fiber cable 1. The fixing member 10 is annularly formed, and is engaged with the end portion of the outer cover 6. The outer diameter of the fixing member 10 after engaging with the outer cover 6 is designed to be greater than the inner diameter of an opening defined by the recesses 8c and 9c. In other words, the fixing member 10 engaged with the outer cover 6 is received in the rear end area of a space as defined by the pusher members 8 and 9, a part of the pusher member 8 being omitted for the purpose of avoiding complication of the drawing, in such a manner that the fixing member 10 is restrained from getting out of the space. That is to say, when the optical fiber cable 1 is pulled near the end portion thereof in the direction as depicted by an arrow A, the fixing member 10 is stopped by the pusher members 8 and 9. Therefore, even if the optical fiber cable 1 is pulled in the direction of the arrow A, there is no possibility that end surfaces 2a and 3a of the optical fibers 2 and 3 are slipped. Moreover, the fixing member 10 is not fixed to the pusher members 8 and 9, but is rotatably received in the space between the pusher members 8 and 9. Accordingly, even if the optical fiber cable 1 is bent near the end portion thereof in the direction as depicted by an arrow B, the optical fiber cable 1 itself suitably rotates in its circumferential direction to thereby avoid creation of large difference in curvature of both the optical fibers 2 and 3.

Figure 2:
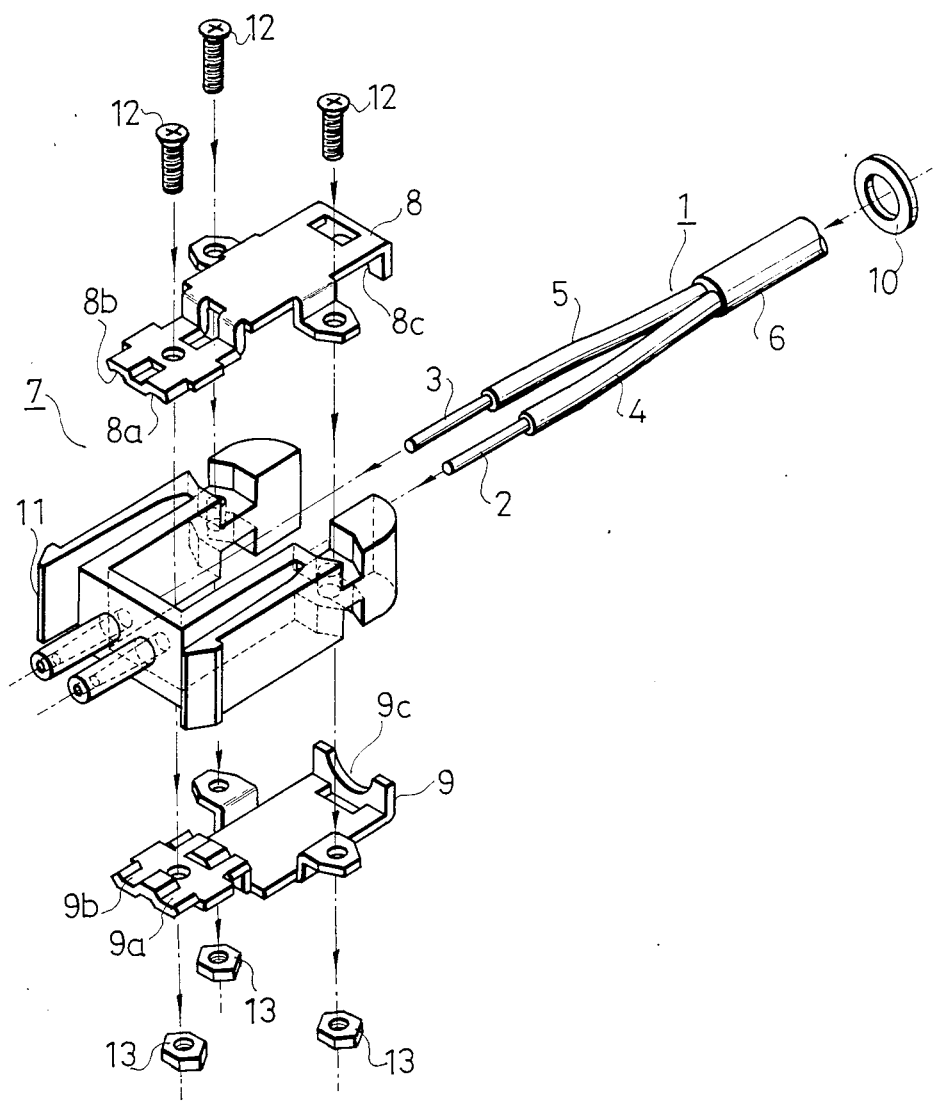
FIG. 2 is an exploded perspective view of the pusher device in another preferred embodiment of the present invention.

FIG. 2 is an exploded perspective view of the pusher device in another preferred embodiment of the present invention, in which the corresponding parts in FIG. 1 are designated by the same reference numerals. Referring to FIG. 2, there are provided a plug 11 made of synthetic resin, clamping screws 12 and clamping nuts 13. A pair of pusher members 8 and 9 formed of a metal plate are designed to hold sheaths 4 and 5 made of polyethylene by a predetermined clamping force of the clamping screws 12 and the clamping nuts 13, and are fixed to the plug 11 under the condition that a fixing member 10 made of metal engaged with an outer cover 6 made of polyvinyl chloride is rotatably received in a space between both the pusher members 8 and 9 in such a manner as to be restrained from getting out of the space.

While the invention has been described with reference to specific embodiments, various modifications and changes may occur to those skilled in the art without departing from the spirit and scope of the invention as defined by the appended claims.

What is claimed is:

1. A pusher device for holding an end of a plastic optical fiber cable of the type having a plurality of optical fibers enclosed in sheaths which extend along a longitudinal axis in parallel with each other and covered in an outer covering, comprising:

a pair of opposing pusher members which are pressed toward each other for clamping onto the sheathed optical fibers of said cable which are exposed at a predetermined position from said outer covering, said pusher members each having, complementarily, a front end provided with pushing portions for clamping on respective ones of the sheathed optical fibers, a wall defining an inside hollow portion extending longitudinally beyond the predetermined exposed position from said outer covering for accomodating respective exposed lengths of the optical fibers therein, and a rear end provided with a recess forming an opening for fitting said cable covered with said outer covering therethrough; and an annular fixing member having an outer diameter which is greater than the opening formed by said recesses in said rear ends of said pushing members, and which is fixed on said cable on the inside of said hollow portion of said pushing members abutting, but not fixed to, said rear ends of said pushing members, whereby said annular fixing member prevents said cable from being pulled in the longitudinal direction and substantially displaced through said rear ends, while at the same time said annular fixing member is left pivotable on the inside relative to said rear ends of said pushing members for allowing said cable to be bent at an angle to the longitudinal axis on the outside without stressfully shortening the lengths of the optical fibers held at said front ends relative to each other.

2. The pusher device as defined in claim 1, wherein said pair of pusher members include front and rear ends, each member having two channel-like pushing portions at the front ends thereof, and each of said sheaths is held by said channel-like pushing portions at the end portion thereof.

3. The pusher device as defined in claim 1, wherein said pusher device comprises a plug made of synthetic resin, clamping screws, clamping nuts, a pair of pusher members formed of a metal plate for holding said sheaths by a predetermined clamping force of said clamping screws and said clamping nuts, said pusher members being fixed to said plug.

* * * * *